United States Patent [19]
Vietorisz

[11] 3,773,068
[45] Nov. 20, 1973

[54] GATE VALVE
[75] Inventor: Joseph A. Vietorisz, Pittsburgh, Pa.
[73] Assignee: Koppers Company, Inc., Pittsburgh, Pa.
[22] Filed: Sept. 10, 1971
[21] Appl. No.: 179,406

[52] U.S. Cl. ............................................. 137/340
[51] Int. Cl. ......................................... F16k 49/00
[58] Field of Search............. 137/340, 454.2, 454.5, 137/454.6; 251/328, 361

[56] References Cited
UNITED STATES PATENTS

| | | | |
|---|---|---|---|
| 3,409,268 | 11/1968 | Gachot | 137/454.2 X |
| 3,521,666 | 7/1970 | Scaramucci | 137/454.2 |
| 3,269,694 | 8/1966 | Hardison | 251/328 X |
| 3,266,517 | 8/1966 | Carr | 137/340 |
| 3,446,476 | 5/1969 | Scaramucci | 251/328 X |
| 2,890,017 | 6/1959 | Shafer | 137/340 X |
| 3,207,174 | 9/1965 | Berczynski | 137/340 X |
| 3,259,143 | 7/1966 | Powell et al. | 137/340 |
| 3,430,689 | 3/1969 | Pantke et al. | 137/340 X |
| 3,439,910 | 4/1969 | Regelin et al. | 137/340 X |
| 3,559,951 | 2/1971 | Whiteman, Jr. | 251/328 X |

*Primary Examiner*—Samuel Scott
*Attorney*—Sherman H. Barber et al.

[57] ABSTRACT

An improved gate valve has a seat that is separable from the valve body. The seat is rigidly clamped between the nozzle flange of the valve body and the mating flange of the downstream duct. Such improved gate valve seat is installed on the upstream side of the valve body also.

3 Claims, 2 Drawing Figures

Patented Nov. 20, 1973

3,773,068

INVENTOR.
JOSEPH A. VIETORISZ
BY Sherman H Barber
Attorney

GATE VALVE

BACKGROUND OF THE INVENTION

Experience has proved that it is difficult to maintain good sealing in larger gate valves; especially when a metal to metal seat is used between the valve disc and the valve body. Large valve bodies, which have fluid cooled seats integrally built therein, cannot economically be made rigid enough to prevent minor deflections of their flat sides.

Thus, when the body is pressurized and/or exposed to heat, the weakest, or most exposed spots will deform to such an extent that the valve disc cannot properly seat. A small local gap will develop around a portion of the seat on the body and seating face of the disc, and leakage will occur. The gap will generally become larger if the valve is used to shut off hot gases since leaking hot gases erode the material of the seat. The difficulties in making a valve leak-proof are growing with increasing valve sizes.

It is now the trend to use even larger valves, especially in connection with the newest blast furnace stoves. Prior art valves, built with integral metal to metal seats, are not capable of preventing leakage when pressurized, without heavy and costly reinforcement of the body. An example would be a large gate-type, chimney valve.

The present invention eliminates the aforementioned difficulties by making the valve seat separable from the valve body in such a way that the valve seat can be readily removed and replaced without taking the entire valve out of the line. Thus, the valve seat of the present invention is insensitive to small deformations of the valve body caused by periodic pressurizing and/or by thermal exposure.

SUMMARY OF THE INVENTION

A gate valve is provided with valve seats that are replaceable from outside the valve body and that are cooperative with a valve disc disposed within the valve body to close and prevent fluid from flowing through the valve.

For a further understanding of the invention and for features and advantages thereof, reference may be made to the following description and the drawing which illustrates a preferred embodiment of equipment in accordance with the invention.

DETAILED DESCRIPTION

Figure 1:
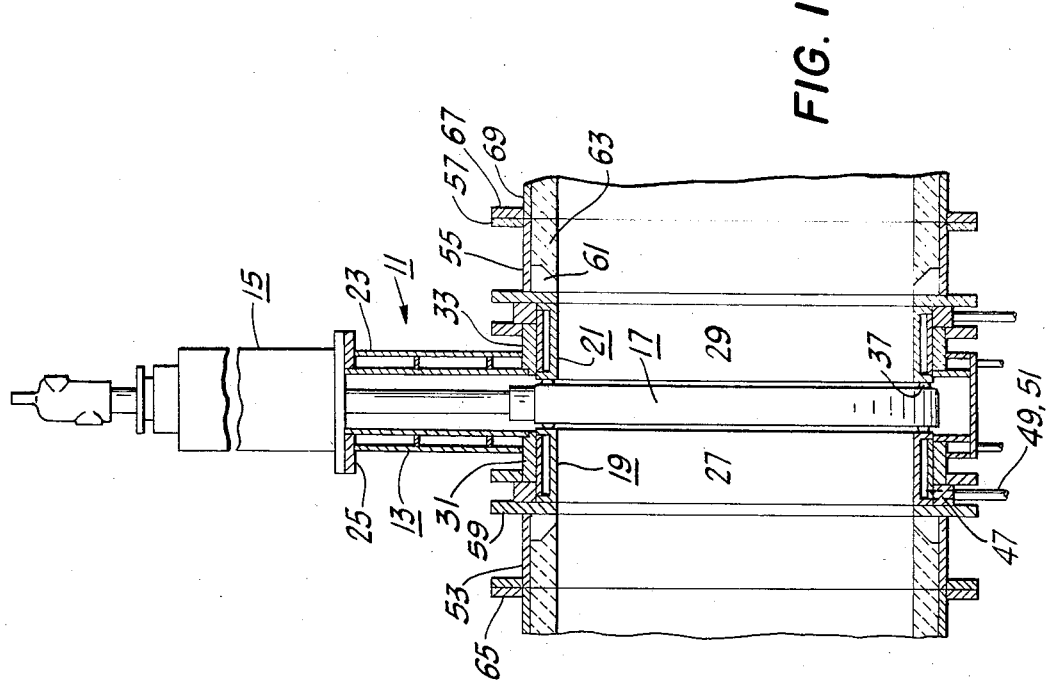
FIG. 1 is a schematic view, partly in section, of a gate valve that incorporates removable valve seats in accordance with the invention.

FIG. 1 illustrates a gate valve 11 which comprises a valve body 13, a valve bonnet 15, a valve disc 17 and valve seats 19, 21 in accordance with the present invention.

The valve body 13 includes a water-cooled structure 23 that is fitted with an annular top flange 25 to which is bolted in conventional manner the valve bonnet 15. The water cooled structure 23 has two, large circular openings 27, 29 therethrough, in each of which there is located a valve nozzle 31, 33; these nozzles being secured to the valve body structure 23 in any suitable manner, as by welding.

The valve disc 17, which is disposed within the valve body 13 as shown, is more or less conventional, as is described in U.S. Pat. No. 3,511,262, except that the valve disc 17 carries either a circular sealing bead 35 on one side only, or sealing beads 35, 37 on both sides. Usually, only one sealing bead 35 and only one removable valve seat 19 are installed and they coact at the same time when the valve disc is in the closed position described hereinafter.

Valve seat 19 is similar to valve seat 21 except that valve seat 21 is to opposite hand. Wherefore, only valve seat 19 is described hereinafter.

Valve seat 19 comprises a channel shaped first circular member 39 and an outer circular band 41 that is welded, or otherwise suitably connected to the flange ends 43 of the channel member 39, thereby forming a water cooling jacket space 45 in the valve seat 19. A blind flange 47 is welded to the circular band 41 about where shown in FIG. 2. The water cooling jacket space 45 receives cooling water through a conduit 49 and the water flows from the jacket space 45 through another similar conduit 51.

Associated with the valve seats 19, 21 are spool pieces 53, 55 which are provided with the usual end flanges 57, 59. The interior of the spool pieces 53, 55 is fitted with brackets 61 that are located about where shown, and they are conveniently arranged in angular spaced apart relation around the interior of the spool pieces 53, 55, thereby making the flange 59 practically a rigid structure. The interior surface of the spool pieces is also lined with a suitable refractory material 63.

Figure 2:
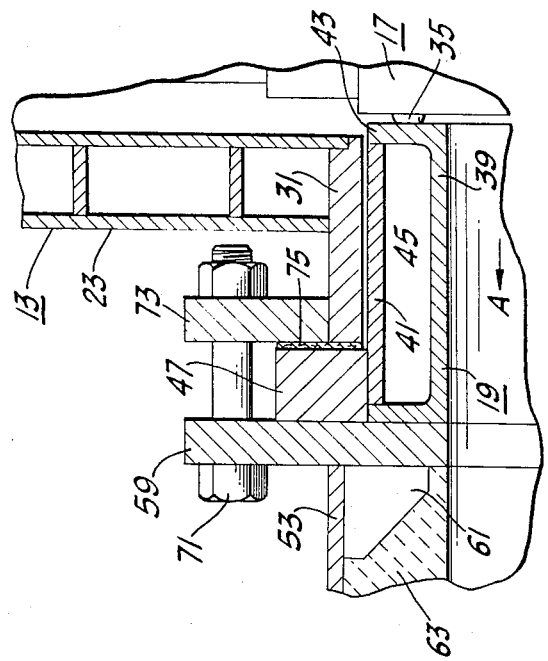
FIG. 2 is a view, at an enlarged scale, of a portion of one of the valve seats of the structure of FIG. 1.

The spool pieces 53, 55 are disposed in abutting relation to the flanges 47 and are secured in a conventional manner to the flanged ends 65, 67 of the conduit or duct 69 in which the valve 11 is installed. As shown in FIG. 2, bolts and nuts 71 connect together flanges 59, 73 of the spool piece and nozzle respectively. From FIG. 2 it will be noted that a gasket 75 of suitable resilient material is disposed between the flanges 47 and 73.

A known form of paste sealing material may be, and preferably is, inserted between the adjacent surfaces of the flange 59 and the flange 47 and valve seat 19. The adjacent surfaces would be first machined so as to be perpendicular to the axis of the conduit or duct 69, in order to provide better sealing surfaces.

An example of the application of a gate-type valve having removable valve seats in a chimney valve used with hot blast stoves for high capacity blast furnaces. This valve is alternately exposed to high pressure and low temperature air, and to low pressure and high temperature burnt gases. Such exposure generally causes distortion of the valve body, and the valve nozzle suffers some small deflections when the valve is periodically pressurized. This deflection is usually most evident at the top or 12 o'clock position. Leakage will be the result of such deformations if the valve seat is integrally built into the valve body, as is customary in valves of the prior art.

However, the valve seat of the present invention seals independently of small deformations usually present in valve seats of the prior art. Also, the valve seat of the present invention can be quickly and readily removed without taking the valve out of service and the valve seat can be replaced in the following manner.

The spool piece, either 53 or 55, that is nearest to the valve seat to be replaced, is removed first. Wherefore, the valve seat 19 can then be moved axially, in the direction of the arrow A of FIG. 2, into the space vacated by the spool piece 53 and removed from the pipeline.

Then, the removed valve seat 19 may be repaired, or a replacement valve seat may be moved into the position from which the valve seat 19 came. Thereafter, the spool piece 53 is replaced and secured in position.

The inserted seat is, preferably, symmetrical about its center line. It is uniformly, and, for all practical purposes, rigidly supported by the mating flange. Temperature differences around the seat are minimized if fast flowing cooling fluid, usually water, is circulated in the cooling jacket space. It has preferably, a cylindrical shape, with simple, uniform cross-section. Thereby, non-uniform, local, mechanical or thermal deformations are practically non-existent in the seat. Consequently, a good seal is achieved for variable operating conditions.

From the foregoing description of one embodiment of the invention, those skilled in the art should recognize many important features and advantages of it, among which the following are particularly significant:

The valve seats are separable from the valve itself and each seat is solidly and uniformly supported in such a way that the seat seals satisfactorily during prolonged operation even under varying conditions;

The valve seats are relatively inexpensive to fabricate; economical to maintain; and spare seats may be readily stored in convenient locations for use when needed;

The sealing seats are made independent of small deformations that usually are present in known valve seats;

The valve seats of the invention admit of shaping and fabricating the valve body in a much less costly manner, since no additional nozzle cooling and no costly, heavy reinforcements are required. The outside diameter of the nozzle furthermore does not have to be machined to close tolerances; and The use of spool pieces aids in the quick removal and replacement of the valve seats without having to remove the valve itself from the pipeline.

Although the invention has been described herein with a certain degree of particularity, it is understood that the present disclosure has been made only as an example and that the scope of the invention is defined by what is hereinafter claimed.

What is claimed is:

1. A gate valve comprising:
   a. a valve body having axially aligned openings with flanges around each opening;
   b. a valve disc in said housing that is movable in a plane substantially as right angles to an axis through said openings;
   c. fluid-cooled valve seats disposed in such openings and positioned to coact with said valve disc when it is in the closed position, said seats being removable in the direction of said axis and away from said valve body when said disc is in the closed position;
   d. means connected to said valve seats and disposed between and coacting with said valve body and external conduit means removably secured to said valve body whereby said valve seats are secured in operative position; and
   e. resilient means disposed between said flange means and said valve body.

2. The combination comprising:
   a. a gate valve having a valve body wherein there is
   b. a movable valve disc;
   c. fluid-cooled valve seats disposed in said valve body on opposite sides of said valve disc that are replaceable axially from outside of and in the direction away from said valve body when said valve disc is in the closed position, and that coact with said valve disc;
   d. a spool piece conduit disposed externally of said valve body and removably connected thereto so as to engage and hold one valve seat in operative position, said spool piece being removable from a conduit in the direction normal to the axis thereof whereby said valve seat is removable axially of said conduit; and
   e. means on said valve seats disposed between said valve body and said spool piece.

3. The valve of claim 2 wherein:
   a. said means is a flange on said valve seat that coacts with said spool piece and said valve body; and including
   b. a resilient gasket disposed between said flange of the valve seat and said valve body.

* * * * *